United States Patent

Galluppi

[15] 3,659,190
[45] Apr. 25, 1972

[54] SWITCHING HIGH-VOLTAGE POWER SUPPLY

[72] Inventor: Filippo B. Galluppi, Mount Vernon, N.Y.
[73] Assignee: Venus Scientific Inc., Farmingdale, N.Y.
[22] Filed: Oct. 6, 1970
[21] Appl. No.: 78,429

[52] U.S. Cl. .................. 323/22 T, 178/5.4 PE, 313/92 PF, 321/27, 320/1
[51] Int. Cl. ........................................................ G05f 1/56
[58] Field of Search ............... 321/27; 323/22 T, 25, 31, 32, 323/33; 307/28, 29, 31-35, 55, 60, 77, 131; 313/92 PF; 315/22; 178/5.4 PE; 320/1

[56] References Cited

UNITED STATES PATENTS

| 3,398,348 | 8/1968 | Kilgore et al. | 321/27 X |
| 3,381,205 | 4/1968 | Howell et al. | 321/27 X |
| 3,330,990 | 7/1967 | Guillette | 313/92 PF X |
| 3,098,170 | 7/1963 | Rhodes | 178/5.4 PE |
| 3,530,357 | 9/1970 | Leowald | 321/27 X |

*Primary Examiner*—Gerald Goldberg
*Attorney*—Ostrolenk, Faber, Gerb & Soffen

[57] ABSTRACT

Two series-connected transistor chains have an output terminal at their junction and are connected in series with a high-voltage power supply. The output terminal is connected to ground through an output capacitor, which may include stray capacitance of the system. The base circuits of each of the transistor chains are transformer coupled to controlled amplitude oscillators which modulate the transistor outputs between given amplitudes. Control of the first transistor chain causes an increase in output by charging the output capacitor to given levels while control of the second transistor chain causes a decrease in voltage output to a minimum value by permitting discharge of the output capacitor. The output of the oscillators is controlled from an operational amplifier which is controlled, in turn, from a function generator.

7 Claims, 4 Drawing Figures

INVENTOR.
FILIPPO B. GALLUPPI
BY
Ostrolenk, Faber, Gerb & Soffen
ATTORNEYS

SWITCHING HIGH-VOLTAGE POWER SUPPLY

BACKGROUND OF THE INVENTION

This invention relates to a power supply which can be switched between a plurality of given voltage levels, and more particularly relates to a controlled power supply which can rapidly switch between output levels which may be several thousand volts apart.

High-voltage switches, which can switch between output voltages several kV apart within a few hundred microseconds, have application to various types of electrical circuits. By way of example, high-resolution color CRT displays using certain combinations of linear and non-linear phosphors will develop different color outputs, depending on the applied electron beam energy, and thus the accelerating voltage used for the tube. To change the color being displayed, the control circuitry causes a change in the accelerating voltage. For example, in one known tube, typical anode potentials for four color operation are: 12.1 kV for yellow-green; 9.7 kV for yellow; 8.4 kV for orange; and 6.7 kV for red. It will be understood that very high switch speeds are necessary in most applications where color signal input changes rapidly. Typically, in a practical application, the circuit should be able to switch by about 6 kV in about 100 microseconds.

Tubes of the type described above are described in the article, MULTICOLOR CATHODE RAY TUBE DISPLAYS, by Francis C. Passavant, in "Computer Design," January 1970, pages 53 to 58. The present invention is for a novel high-voltage power supply for such tubes, which can be switched between various required voltage levels in a short time.

SUMMARY OF THE INVENTION

In accordance with the invention, two high-voltage series transistor chains are carrier modulated by pulses of variable amplitude connected to the transistor bases. One transistor chain is used to drive the output voltage on an output capacitor upward while the other transistor chain is arranged to permit the capacitor to discharge to bring the output voltage down. Each of the transistors is coupled to the base drive through small individual ferrite cores which receive a single primary line. Thus, the primary can be easily insulated against as much as 15,000 volts. The system is then operated by suitably controlling the oscillator which generates the modulating carrier to adjust the amplitude of the modulating signal, thereby to control the impedance of the various transistors, and thus the output capacitor charge and the output level of the circuit.

DESCRIPTION OF THE PREFERRED EMBODIMENTS

Figure 1:
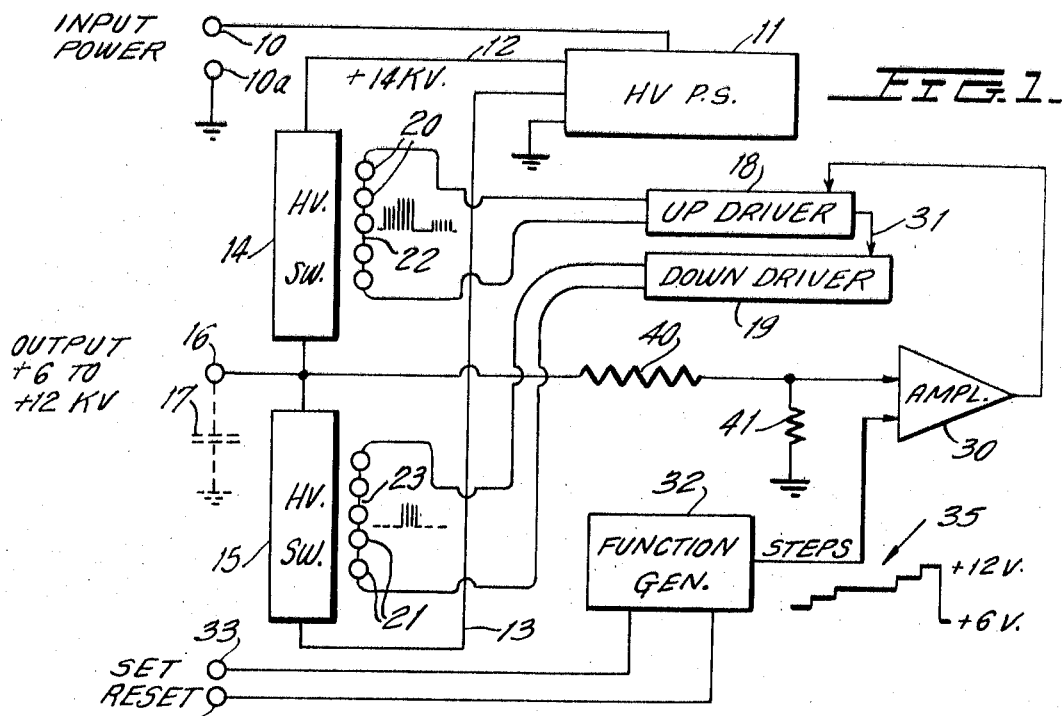
FIG. 1 is a block diagram of the circuit of the invention.

Referring first to FIG. 1, there is schematically illustrated an input power terminal 10 and ground terminal 10a which are connectable to any suitable power source. Terminal 10 is then connected to a suitable high-voltage power supply 11, which may be any suitable regulated power supply which provides a first output line 12 which is, for example, 14 kV above ground, and a second output line 13 which is, for example, 5 kV above ground. Lines 12 and 13 are then connected to the ends of two series-connected high-voltage switch elements or chains of transistors 14 and 15, respectively, each consisting of a suitable number of series-connected transistors. The junction between chains 14 and 15 is connected to output terminal 16 which, in turn, is connected to output capacitor 17. Capacitor 17 can, for example, include the distributed capacitance to ground of the circuit, and of the accelerating electrode of a CRT to ground and will have a value of about 100 microfarads.

The transistors of "switches" 14 and 15 are coupled to oscillators or drivers 18 and 19, hereinafter referred to as up-driver 18 and down-driver 19, by ferrite cores, schematically shown as cores 20 and 21, respectively. Note that the cores can simply surround straight conductor sections 22 and 23, respectively, which serve as primary windings for cores 20 and 21, respectively. Thus, good high-voltage insulation and electrical isolation of the control circuitry from the high-voltage elements is easily obtained.

Up-driver 18 and down-driver 19 have their output amplitudes controlled, ultimately, from the output of operational amplifier 30, and are so interconnected, as by lead 31, that only up-driver 18 or down-driver 19 can have an output at any instant. The operational amplifier then receives a first input from function generator 32, which is operated by inputs from a set terminal 33 or reset terminal 34. It is to be noted that other control inputs could be provided in place of function generator 32. By way of example, a source of d-c levels, shown schematically as levels 35, could be provided to selectively apply given control d-c voltage levels to the input of amplifier 30. As will be later seen, the input d-c control level, or the pulses applied to terminals 33 and 34, will determine the output voltage at output terminal 16. In order to regulate against load changes at output terminal 16, the output at terminal 16 is sampled through the resistor divider consisting, for example, of a 200 megohm resistor 40 and 200K resistor 41. This sampled signal is then connected to the second input of amplifier 30. This arrangement, in connection with the capacitance 17 which will store charge between drive pulses, will form a closed loop amplifier which will regulate against load changes, for example, between 0 to 500 microamperes, or respond to input commands from function generator 32.

Figure 2:
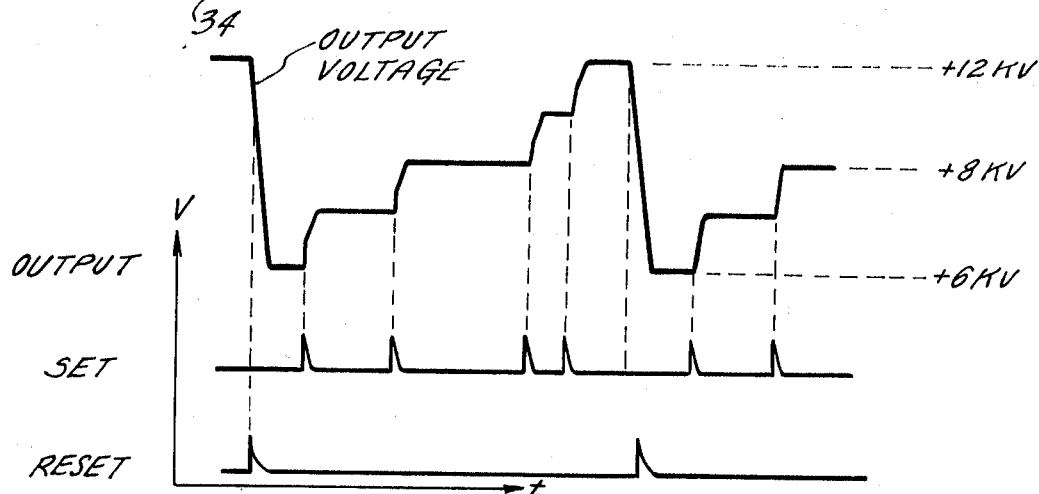
FIG. 2 shows a typical output voltage curve superimposed on the set and reset pulses which cause the change in voltage output level.
Figure 3:
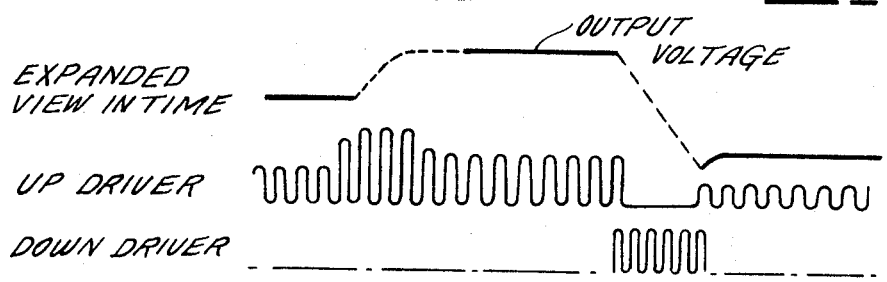
FIG. 3 is an expanded view of the up-driver and down-driver output carrier signals, superimposed on a corresponding portion of the output voltage of the device.

The operation of the system of FIG. 1 is shown diagrammatically in FIGS. 2 and 3. Thus, in FIG. 2, the output voltage is shown as being switched between 6 kV to 12 kV in 1 kV steps by pulses applied to the set and reset terminals 33 and 34, respectively. This is accomplished by varying the amplitude of the high frequency signal applied to the bases of the transistors in chain 14 or chain 15. Thus, when chain 14 is biased with a high-amplitude high-frequency signal, the peak current of the pulses through switch 14 will charge capacitor 17 to the 12 kV level. Note that there is a constant discharge of capacitor 17 through parallel resistor circuits, not shown, so that a stabilized capacitor charge can be reached. If some smaller voltage level was needed at output terminal 16, the base signal to switch 14 would be smaller, so that the pulses flowing through switch 14 would be smaller in amplitude, to charge capacitor 17 to a correspondingly smaller voltage. In order to reduce the output voltage at terminal 16, the down-driver 15 is made conductive by a high frequency signal applied to its transistor bases. This permits capacitor 17 to discharge through switch 15 until the charge on capacitor 17 and thus the output at terminal 16 reaches its desired value.

FIG. 2 shows a typical switching operation. Initially in FIG. 2, chain 15 is at its highest impedance (receiving the smallest biasing pulse amplitude) and chain 14 is biased to its lowest impedance and terminal 16 has a potential of 12 kV relative to ground. Note that during this time there is no output signal from down-driver 19 while the magnitude of the output carrier signal from up-driver 18 is at its maximum. In order to decrease the output voltage at terminal 16, a suitable control circuit generates a reset pulse on terminal 34. This reset pulse operates through amplifier 30 to cut off up-driver 18 and turn on down-driver 19, as shown in FIG. 3. Thus, chain 14 assumes a high impedance condition and chain 15 turns on.

In order to increase the output voltage level, programmed set pulses are applied to terminal 33. Each of these set pulses causes the function generator 32 to increase the amplitude of the carrier output of up-driver 18, thereby decreasing the impedance and forward drop on chain 14 and correspondingly increasing the potential at terminal 16.

Typically, the carrier frequency of up-driver 18 and down-driver 19 is about 400 kilocycles. This can give a transition turn of about 100 microseconds when going from voltage levels about 1,500 volts apart.

Figure 4:
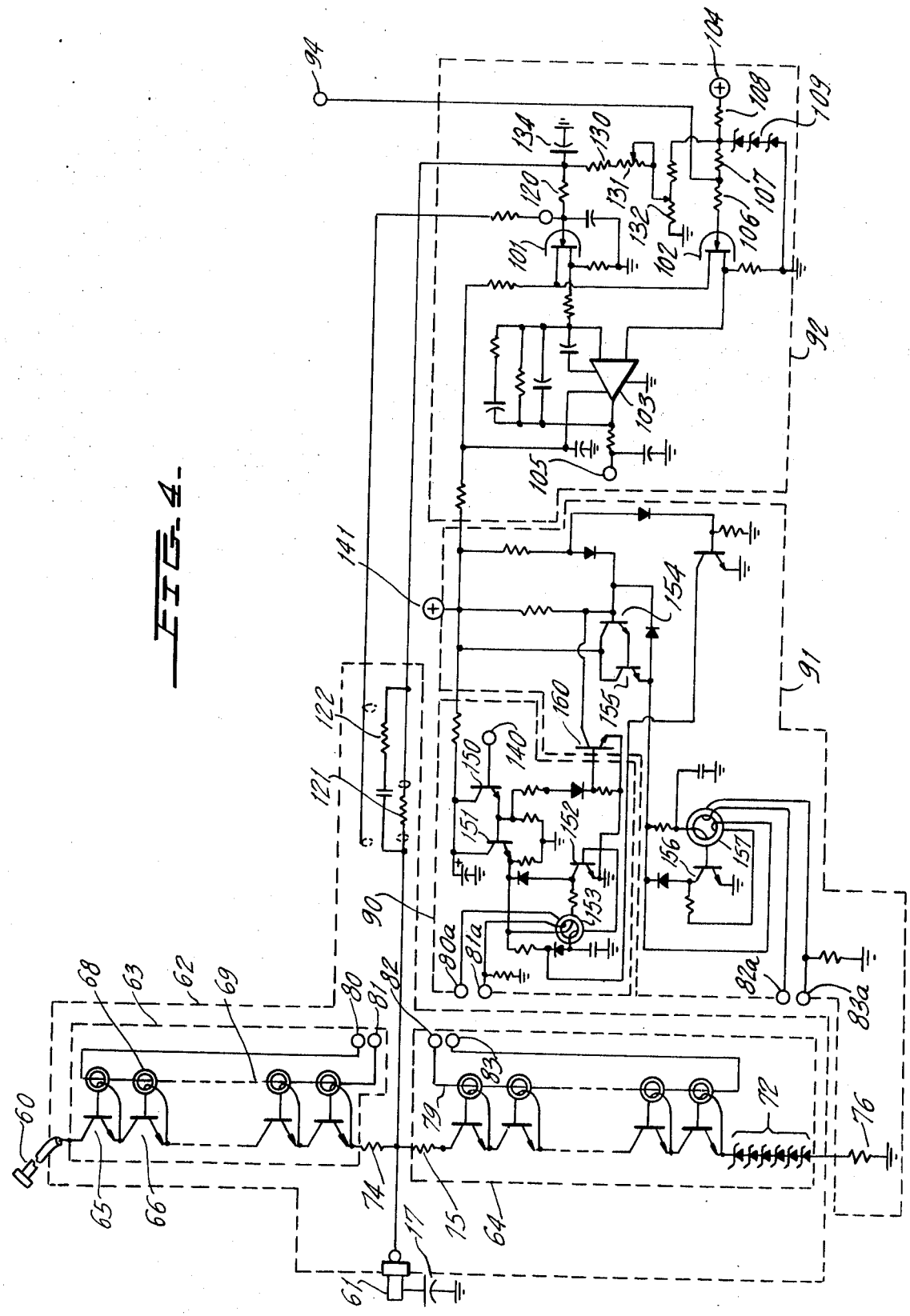
FIG. 4 shows a detailed circuit diagram of a preferred embodiment of the present invention.

Referring to FIG. 4, a suitable high-voltage power supply, not shown, is connected to high-voltage connector 60, which is connected to the transistor chains which control the output voltage at output voltage terminal 61. Connector 60 can be at, for example, 14 kV relative to ground. Note that terminal 61 extends through a suitable chassis, shown in dotted lines 62, which supports the transistor chains. These chains consist of a first chain, within dotted lines 63, which operates to increase the voltage at terminal 61, and a second chain, within dotted lines 64, which operates to decrease the voltage at terminal 61. Thus, assemblies 63 and 64 correspond to transistor means 14 and 15 in FIG. 1. Note that the essential capacitance 17 to ground is present at terminal 61.

Transistor chain 63 consists of a plurality of series-connected transistors, such as transistors 65 and 66, where, in a typical example, seventeen such transistors are provided. A corresponding number of ferrite cores, such as ferrite cores 67 and 68, are provided, one for each transistor, with the plurality of ferrite cores receiving a common straight through winding, shown as conductor 69, which serves as the primary winding of each core. Each of the cores then has a respective secondary winding, such as windings 70 and 71 for cores 67 and 68, respectively. The secondary winding of each of the cores is then connected in the base-emitter circuit of its respective transistor.

An identical construction is then used for the series-connected transistor chain in dotted lines 64, which serves as the down-driver. The bottom of the transistor chain 64 is then connected to a zener diode string 72 which places the bottom of the transistor chain, for example, at 5 kV relative to ground.

The two chains of transistors 63 and 64 are then connected to one another through resistors 74 and 75 and the series connection is connected to ground through the zener stack 72 and resistor 76.

Conductor 69 of chain 63, and the corresponding conductor 79 of chain 64, are provided with terminals 80–81 and 82–83, respectively. These terminals are suitably connected to corresponding terminal pairs 80a–81a and 82a–83a of the up-driver circuit 90 and down-driver circuit 91, respectively, shown as enclosed within corresponding dotted lines. Note that the up-driver 90 and down-driver 91 correspond to drivers 18 and 19, respectively, of FIG. 1. As will be later described in detail, the up and down-drivers 90 and 91 consist of blocking oscillators whose output voltage is amplitude modulated by the output of a control circuit 92.

The operation of control circuit 92 is, in turn, controlled as by a function generator 32 (FIG. 1) or by the connection of suitable d-c control voltages to input terminal 94 shown in FIG. 4, which d-c signals can be derived from any desired command circuit which calls for the switching of the output voltage at terminal 61 between given values.

Control circuit 92 includes a pair of field-effect transistors 101 and 102, and a differential operational amplifier 103. Control voltage, for example, 24 volts relative to ground, is applied to terminal 104, and the output signal of the control circuit is developed on output terminal 105. The circuit including resistors 106 and 108, and zeners 109 is coupled to the input or analog command d-c signal applied to terminal 94 to operate FET 102 in accordance with this input signal as compared to a reference voltage. A feedback signal is then connected to feedback resistor 120, through the circuit including the resistor divider which, in turn, includes resistors 121 and 122 (in chassis 62 and corresponding to resistors 40 and 41 of FIG. 1), and resistors 130, 131, 132 and 133, and capacitor 134. Thus, FET 101 is driven in accordance with the sampled output voltage at terminal 61. The outputs of FET 101 and FET 102 are then applied, as shown, to the input terminals of differential operational amplifier 103, which produces an output signal on terminal 105, representative of a difference between the actual output voltage level at terminal 61, and the voltage level of terminal 61 being called for by the input signal at terminal 94.

Output terminal 105 of chassis 92 is connected to input terminal 140 of the up-driver circuit 90. A source of control voltage is also provided for up-driver 90 from terminal 141 shown in chassis 91. Up-driver 90 consists of an emitter-follower amplifier including transistors 150 and 151, connected to a blocking oscillator containing the transistor 152 with the oscillator output coupled to output terminals 80a and 81a by the ferrite core transformer 153. A similar amplifier and blocking oscillator circuit forms the down-driver 91 and consists of transistors 154, 155 and 156, with the down-driver output coupled to terminals 82a and 83a by ferrite core transformer 157.

In order to insure that only one of up-driver 90 or down-driver 91 will operate at any one time, the circuits are coupled by a level sensing transistor 160 located in down-driver 91. Transistor 160 permits down-driver 91 to develop an output signal at terminals 82a and 83a only when there is no signal at terminal 140 sufficient to operate transistor 150 and the up-driver 90.

Both up-driver 90 and down-driver 91 have been designed to operate at a frequency of about 400 kilocycles, with a pulse width of about 0.3 microseconds.

The operation of the circuit of FIG. 4 is as follows:

If a given voltage output is required, for example, 12 kV, from terminal 61 to ground, an appropriate d-c signal level is applied to terminal 94. This will change the output of FET 102 relative to its last output level, and relative to the output voltage sampled by the feedback circuit coupled to FET 101. Accordingly, the output of differential operational amplifier 103 is changed at terminal 105 to change the input voltage to up-driver input terminal 140. Assuming that the input signal level at terminal 140 is increased, the output amplitude of the relatively fixed frequency pulses at terminals 80a and 81a of the blocking oscillator increases. Therefore, the high frequency signal applied to the bases of the transistor of up-driving switch 63 at terminals 80 and 81 is increased. This, in turn, increases the amplitude of collector current pulses which flow when the base signal pulse appears so that output capacitor 17 will charge to a higher equilibrium voltage, as directed by the input signal at terminal 94.

During this up-driving operation, the down-driver switch 64 was off. This is because level sensing transistor 160, responsive to the signal level at terminal 140 calling for up-driver operation, suppressed the operation of the down-driver 91.

Once the input voltage at terminal 140 falls below a given value, transistor 160 cuts off to permit operation of down-driver 91. Thus, when a voltage output of, for example, 6 kV is required, the signal at terminal 94 is sufficiently low, that the signal output from operational amplifier 103 permits cut off of transistor 160. This causes the operation of the down-blocking oscillator so that a high-frequency signal is developed at terminals 82a and 83a, thus applying a high-frequency signal to the base of the transistors in the down-driver switch 64. Each time a base pulse is applied, the transistors of the string conduct, permitting capacitor 17 to discharge until the 6 kV output level is reached. Thereupon, and as shown in FIG. 3, the feedback circuit brings the up-oscillator back on at minimum output amplitude, sufficient to hold the desired output voltage level at terminal 61.

The novel circuit of FIG. 4 will operate to switch between voltage levels 1,500 volts apart in 100 microseconds. Accordingly, the circuit can be used in connection with single gun color cathode ray tubes.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A switchable high-voltage d-c power supply having a variable output voltage for a load having a given capacitance comprising, in combination:
    a source of high voltage;
    first and second transistor means connected in series with said source of high voltage;
    each of said first and second transistor means including first and second electrodes; said first and second electrodes of said first and second transistor means being connected in series with one another; each of said first and second transistor means including a control electrode;
    an output voltage terminal connected between said first and second transistor means;
    a first oscillator means defining an up-driver and having a controllably variable output voltage amplitude connected to said control electrode of said first transistor means;
    a second oscillator means defining a down-driver and having a controllably variable output voltage amplitude connected to said control electrode of said second transistor means;
    and an input control circuit means connected to said first and second oscillator means for controlling the outputs thereof to control the voltage at said output voltage terminal in a predetermined manner; said input control circuit means operating only one of said up-driver and down-driver at a given time to increase or decrease respectively the output voltage of said power supply; said given capacitance of the load having a value sufficient for permitting effective storage of charge during the time interval between cycles of said first and second oscillator means; said first and second oscillator means having an output frequency of at least the order of kilocycles.

2. The power supply of claim 1 which includes circuit means connected to said output voltage terminal for monitoring the instantaneous output voltage thereat, and comparator means for comparing said monitored voltage to a voltage at said input control circuit means to form a closed loop amplifier type system for regulating the output voltage at said output voltage terminal against load current variation.

3. The power supply of claim 1 which includes means for connecting said output voltages of said first and second oscillator means to said first and second transistor means, respectively; said means including at least one ferromagnetic core for each of said first and second oscillator means; each of said ferromagnetic cores comprising a single turn primary winding connected to said first and second oscillator means, respectively, and a secondary winding connected to said control electrode and one of said first and second electrodes of said first and second transistor means, respectively.

4. The power supply of claim 1 wherein said first and second transistor means each comprise a chain of series-connected transistors.

5. The power supply of claim 3 wherein said first and second transistor means each comprise a chain of series-connected transistors.

6. The power supply of claim 4 wherein the number of transistors in said first and second chains is sufficient to withstand at least 14 kV from said source of voltage.

7. The power supply of claim 4 wherein said first and second transistor electrodes and said control electrode of each of said first and second transistor means constitute emitter, collector and base terminals, respectively.

* * * * *